(12) United States Patent
Gupta et al.

(10) Patent No.: US 12,347,204 B2
(45) Date of Patent: Jul. 1, 2025

(54) ADAPTIVE FEATURE EXTRACTION TO DETECT LETTERS AND EDGES ON VEHICLE LANDING SURFACES

(71) Applicant: Honeywell International Inc., Charlotte, NC (US)

(72) Inventors: Nikhil Gupta, Bengaluru (IN); Shouvik Das, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 443 days.

(21) Appl. No.: 17/726,007

(22) Filed: Apr. 21, 2022

(65) Prior Publication Data

US 2023/0282001 A1    Sep. 7, 2023

(30) Foreign Application Priority Data

Mar. 4, 2022    (IN) .............................. 202211011854

(51) Int. Cl.
*G06V 20/56* (2022.01)
*B64D 45/08* (2006.01)
(Continued)

(52) U.S. Cl.
CPC ............. *G06V 20/56* (2022.01); *B64D 45/08* (2013.01); *B64D 47/08* (2013.01); *G06T 7/13* (2017.01); *G06V 10/40* (2022.01)

(58) Field of Classification Search
CPC ........ G06V 20/56; G06V 10/40; G06V 10/44; G06V 20/17; B64D 45/08; B64D 47/08; G06T 7/13
See application file for complete search history.

(56) References Cited

U.S. PATENT DOCUMENTS

| 6,157,876 A | 12/2000 | Tarleton, Jr. et al. |
| 8,594,447 B2 | 11/2013 | Smith |

(Continued)

FOREIGN PATENT DOCUMENTS

| CN | 101777181 B | 1/2012 | |
| EP | 1335258 B1 * | 8/2006 | ........... G05D 1/0676 |

(Continued)

OTHER PUBLICATIONS

Krajsek, Steerable Filters in Motion Estimation, 2006, Computer Vision Group, Version 1.0, pp. 1-30 (Year: 2006).*

(Continued)

*Primary Examiner* — Oneal R Mistry
*Assistant Examiner* — Justin Philip Cascais
(74) *Attorney, Agent, or Firm* — Fogg & Powers LLC

(57) ABSTRACT

A vison-based landing system comprises a processor onboard an aerial vehicle, an onboard vision sensor, onboard aiding sensors, and a data storage unit. The processor hosts an adaptive feature extraction module operative to perform a method that comprises capturing an image of a landing area having a plurality of edge features; calculating an estimated slope of an expected edge feature; calculating an expected gradient direction of the expected edge feature; selecting a horizontal basis kernel for the expected edge feature along an expected horizontal gradient; selecting a vertical basis kernel for the expected edge feature along an expected vertical gradient; calculating a combined convolution kernel for the expected edge feature based on the horizontal and vertical basis kernels, the estimated slope, and the expected gradient direction; and performing a convolution operation on the image using the combined convolution kernel to obtain an edge feature image of the landing area.

20 Claims, 9 Drawing Sheets

(51) Int. Cl.
B64D 47/08 (2006.01)
G06T 7/13 (2017.01)
G06V 10/40 (2022.01)

(56) References Cited

U.S. PATENT DOCUMENTS

| | | | |
|---|---|---|---|
| 9,483,952 B2 | 11/2016 | Chew | |
| 9,569,668 B2 | 2/2017 | Schertler | |
| 2016/0086497 A1* | 3/2016 | Williams | G08G 5/57 701/16 |

FOREIGN PATENT DOCUMENTS

| | | |
|---|---|---|
| EP | 1860456 A1 | 11/2007 |
| EP | 2920741 B1 | 12/2017 |

OTHER PUBLICATIONS

Groot, Detecting edges using the Marr-Hildreth approach, 2011, Bibliotheek der R.U., 8th , pp. 1-119 (Year: 2011).*

Abu-Jbara et al., "A Robust Vision-based Runway Detection and Tracking Algorithm for Automatic UAV Landing", 2015 International Conference on Unmanned Aircraft Systems (ICUAS), IEEE, Denver, Colorado, USA, Jun. 9-12, 2015, pp. 1148 through 1157.

Angermann et al., "High Precision Approaches Enabled by an Optical-Based Navigation System", Proceedings of the ION 2015 Pacific PNT Meeting, Honolulu, Hawaii, Apr. 20-23, 2015, pp. 694 through 701.

Canny, "A Computational Approach to Edge Detection", IEEE Transactions on Pattern Analysis and Machine Intelligence, vol. PAMI-8, No. 6., Nov. 1986, pp. 679 through 698.

European Patent Office, "Extended European Search Report", from EP Application No. 23156413.9, from Foreign Counterpart to U.S. Appl. No. 17/726,007, filed Jun. 28, 2023, pp. 1 through 12, Published: EP.

Li et al., "Efficient Filtering for Edge Extraction under Perspective Effect", Applied Sciences, Sep. 15, 2021, vol. 11, No. 18, 8558, pp. 1 through 22.

Dockrill, Peter, "German Scientists Pull Off Truly Autonomous Aircraft Landing in Stunning Video" as downloaded from https://www.sciencealert.com/german-scientists-pull-off-truly-autonomous-aircraft-landing-in-stunning-video on Dec. 14, 2021, pp. 1 through 3.

Kugler, et al., "Automatic Landing with a Diamond Aircraft DA42: "Eyes" for the autopilot" Jul. 4, 2019, as downloaded from https://www.diamondaircraft.com/en/about-diamond/newsroom/news/article/automatic-landing-with-a-diamond-aircraft-da42-eyes-for-the-autopilot2, pp. 1 through 3, (c) 2022, Diamond Aircraft Industries.

Zhang, Harvest, "How Wayfinder is Using Neural Networks for Vision-Based Autonomous Landing" as downloaded from https://acubed.airbus.com/blog/wayfinder/how-wayfinder-is-using-neural-networks-for-vision-based-autonomous-landing/, on Dec. 14, 21, pp. 1 through 10.

* cited by examiner

ADAPTIVE FEATURE EXTRACTION TO DETECT LETTERS AND EDGES ON VEHICLE LANDING SURFACES

CROSS REFERENCE TO RELATED APPLICATION

This application claims benefit of Indian Provisional Application No. 202211011854 filed on Mar. 4, 2022, and entitled ADAPTIVE FEATURE EXTRACTION TO DETECT LETTERS AND EDGES ON VEHICLE LANDING SURFACES, the contents of which are incorporated herein in their entirety.

BACKGROUND

Aviation is becoming more ubiquitous and the number of airports, heliports, and more recently vertiports, are on the rise. Regional aviation is becoming a more popular mode of transport, especially with upcoming electric airplanes. With these developments, there will be a rise in need for pilots, which would likely fulfilled by younger and lesser experienced pilots. With such an ecosystem, aiding technologies for navigation like vision-based systems are going to be needed.

Vision augmented aircraft landing is a technology that can significantly reduce onboard equipment, both in terms of weight and cost. A camera and processing computer can replace multiple other sensors for landing such as a radio altimeter and an onboard instrument landing system (ILS) receiver. However, determining features of the landing location using techniques like edge detection to find an expected orientation and gradient of the landing markers can be a challenge when landing a vehicle in a target landing zone. These determinations can be hindered by lot of false positives present alongside the required features. For example, detecting the edge of heliport markings is hindered significantly by the presence of similar angled lines around the landing pad. Likewise, detecting a runway edge is hindered by the presence of similar angled lines around the actual runway edges. These hinderances limit the usage of simple techniques for vision-based landing systems.

SUMMARY

A vison-based landing system comprises at least one processor onboard an aerial vehicle; at least one vision sensor onboard the aerial vehicle and operatively coupled to the at least one processor; one or more aiding sensors onboard the aerial vehicle and operatively coupled to the at least one processor; and a data storage unit in operative communication with the at least one processor. The at least one processor hosts an adaptive feature extraction module, which has processor readable instructions to perform a method to detect edges on a landing area for the aerial vehicle. This method includes capturing at least one image of the landing area with the at least one vison sensor, wherein the landing area includes a plurality of edge features; calculating an estimated slope of an expected edge feature of the landing area; calculating an expected gradient direction of the expected edge feature; selecting a horizontal basis kernel for the expected edge feature along an expected horizontal gradient; selecting a vertical basis kernel for the expected edge feature along an expected vertical gradient; calculating a combined convolution kernel for the expected edge feature based on the horizontal and vertical basis kernels, the estimated slope of the expected edge feature, and the expected gradient direction of the expected edge feature; and performing a convolution operation on the at least one image using the combined convolution kernel to obtain a resulting edge feature image of the landing area.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1A:
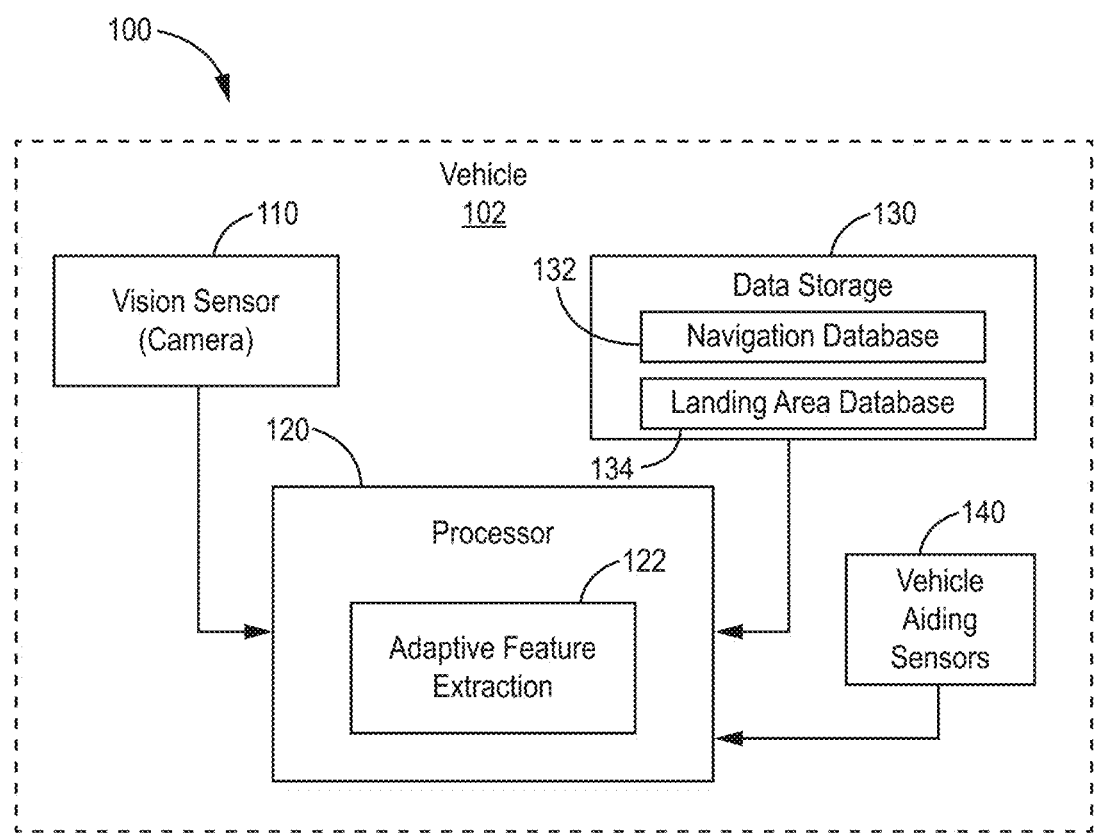
FIG. 1A is a block diagram of a vision-based landing system that employs adaptive feature extraction to detect edges on vehicle landing surfaces, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for adaptive feature extraction to detect letters and/or edges on vehicle landing surfaces is described herein. The present approach provides a way of extracting well defined structures and features from visual data, such as images of runway edges, helipad markings, landing pad markings, or the like. The visual data is captured using one or more onboard vehicle cameras.

The present method provides for estimating a vehicle pose relative to a plurality of known well-defined features on the ground. The present method reduces the number of detected candidates for a desired feature, and therefore increases integrity of the system by reducing the probability of a mismatch.

A significant challenge in doing vision-based pose estimation for an aerial vehicle is the accurate detection of corners and edges of a region of interest. Since these scenarios are used in well-defined conditions, such as well-marked runways and helipads, the present approach utilizes this information from a navigation database to improve detection of such edges. For example, a heliport landing area typically has clearly demarcated edges and threshold markings, with well-defined edge thicknesses and lengths.

In traditional edge detection methods, a conventional gradient filter is used to extract sharp gradients in an image. Gradient filters are usually unidirectional, which means one filter can only extract edges in a particular direction. Hence, multiple filters have to be applied to the same image over and over again, where each filter comprises a particular direction. This traditional approach does a good job of extracting all possible edges in the image, but fails at highlighting a desired edge from undesired edges, and needs multiple iterations of filters on the same image to yield the desired result. Therefore, additional filtering is required to extract required edges from a large set of candidates. The present approach provides such filtering and ensures that the well-defined knowledge of a region of interest is utilized effectively. In addition, using localization information from certified vehicle sensors and a navigation database makes it easier to prove the integrity of the system.

The present approach provides a visual navigational landing system for aerial vehicles, which includes a technique to adapt feature detection to any predefined shape or feature, such as aruco markers, runway edges, heliport markings, vertiport markings, or any other predefined landing markings. The present approach can be applied in the navigation of various aerial vehicles, including traditional fixed wing airplanes, helicopters, vertical take-off and landing (VTOL) vehicles such as hybrid VTOL vehicles, unmanned aerial vehicles (UAV) unmanned aircraft systems (UAS) vehicles for package delivery, air taxis such as urban air mobility (UAM) vehicles, or the like. The present approach does not require any ground augmentation apart from a distinct runway, strip, helipad, vertiport, or any other designated landing area, on which the aerial vehicle can land. The present method can be used in applications such as providing visual position estimates, sense and avoid, precision landing of aerial vehicles, aircraft visual docking at gates, and the like.

The present method uses other source of information such as a vehicle's coordinates and a navigation database to get an estimate of a desired edge's slope and length being detected. Moreover, the present method can detect letter marking edges, such as the "H" or "V" or any other known markings on any heliport or vertiport, for various vehicle landing applications.

The present approach provides richer information in the form of guidance and navigation cues that can be provided to a pilot. The present algorithm can also work in longer ranges (using zoom techniques), where visual acquisition by humans is not feasible.

In one example, the present method can enable a vision-based UAM landing from a height of about 50-60 m, without any extra equipment on the ground. In another example, the present method can be used for an aircraft glideslope and localizer deviation estimation at distances of around 3 nautical miles from a runway aiming point without the ILS equipment physically being present on the runway.

Further details related to the present system and method are described as follows and with reference to the drawings.

FIG. 1A illustrates a vision-based landing system 100, according to one embodiment, which employs adaptive feature extraction to detect edges on vehicle landing surfaces. The vision-based landing system 100 comprises at least one vision sensor 110 such as a camera, located onboard a vehicle 102 such as an aircraft, and at least one processor 120 onboard vehicle 102. The processor 120 is operative to receive image data from vision sensor 110. The processor 120 is in operative communication with a data storage unit 130, which includes a navigation database 132 and a landing area database 134. In one embodiment, data storage unit 130 is located onboard vehicle 102. In other embodiments, information from navigation database 132 and landing area database 134 can be relayed to vehicle 102 via a communication link, such as when data storage unit 130 is located on the ground.

The processor 120 is also operatively coupled to one or more vehicle aiding sensors 140, which can include one or more inertial sensors such as an inertial measurement unit (IMU), a global navigation satellite system (GNSS) receiver such as a global positioning system (GPS) receiver, a light detection and ranging (LiDAR) device, a radio detection and ranging (RADAR) device, or the like. The processor 120 hosts an adaptive feature extraction module 122, which has processor readable instructions to perform a method to detect letters and edges on a landing surface for vehicle 102.

Figure 1B:
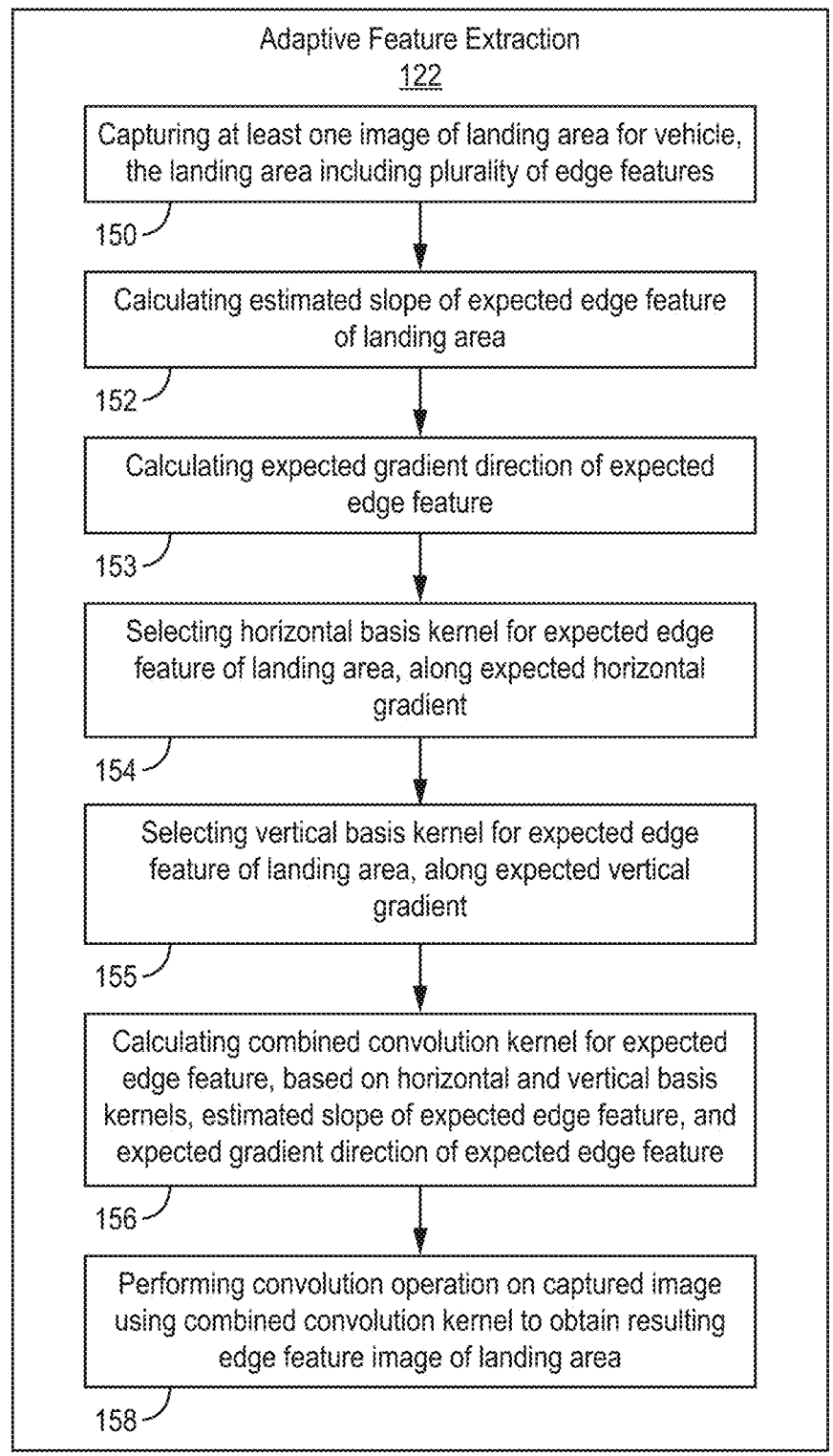
FIG. 1B is flow diagram of a method performed by an adaptive feature extraction module of the system of FIG. 1A, according to an exemplary implementation.

FIG. 1B is flow diagram of the method performed by adaptive feature extraction module 122, according to an exemplary implementation. The method comprises capturing at least one image of a landing area for vehicle 102 using vision sensor 110, with the landing area including a plurality of edge features (block 150). The method also includes calculating an estimated slope of an expected edge feature of the landing area (block 152), and calculating an expected gradient direction of the expected edge feature (block 153). The method also includes selecting a horizontal basis kernel for an expected edge feature of the landing area, along an expected horizontal gradient (block 154), and selecting a vertical basis kernel for an expected edge feature of the landing area, along an expected vertical gradient (block 155). The method calculates a combined convolution kernel for the expected edge feature, based on the horizontal and vertical basis kernels, the estimated slope of the expected edge feature, and the expected gradient direction of the expected edge feature (block 156). The method then performs a convolution operation on the captured image using the combined convolution kernel to obtain a resulting edge feature image of the landing area (block 158).

Additional details related to implementing the adaptive feature extraction method are described hereafter.

Figure 2A:
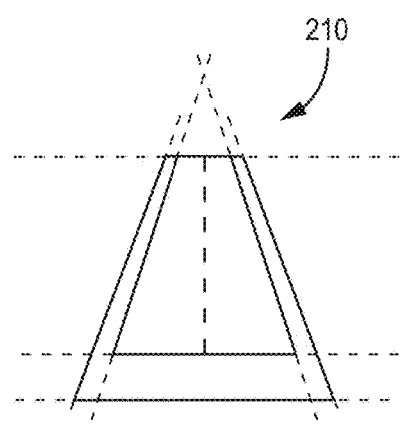
FIG. 2A is a schematic diagram of an aircraft runway, for which the system of FIG. 1A can be employed to detect edges on the runway.
Figure 2B:
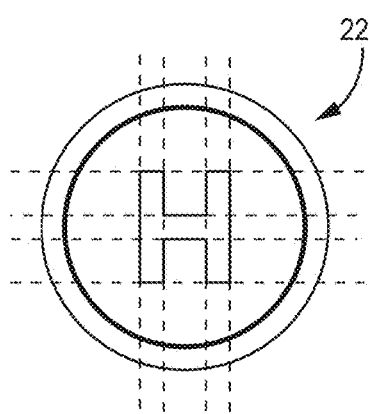
FIG. 2B is a schematic diagram of a helipad, for which the system of FIG. 1A can be used to detect markings on the helipad.
Figure 2C:
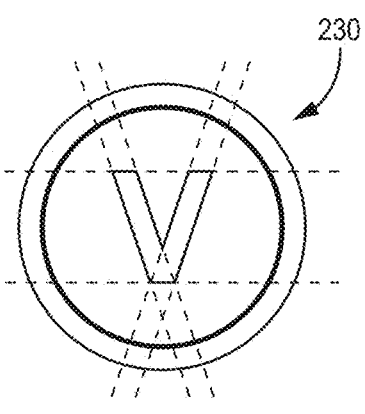
FIG. 2C is a schematic diagram of a vertiport, for which the system of FIG. 1A can be employed to detect markings on the vertiport.

The adaptive feature extraction method can be implemented as a computer vision algorithm in various applications to detect edges and/or letters on a vehicle landing surface. For example, FIG. 2A is a schematic diagram of an aircraft runway 210, for which the adaptive feature extraction method such as used by vision-based landing system 100 (FIG. 1A), can be employed to detect edges on the aircraft runway 210. FIG. 2B is a schematic diagram of a helipad 220, for which the adaptive feature extraction method such as used by vision-based landing system 100, can be used to detect markings on helipad 220 (e.g., the letter "H"). FIG. 2C is a schematic diagram of a vertiport 230, for which the adaptive feature extraction method such as used by vision-based landing system 100, can be employed to detect markings on vertiport 230 (e.g., the letter "C").

Figure 3:
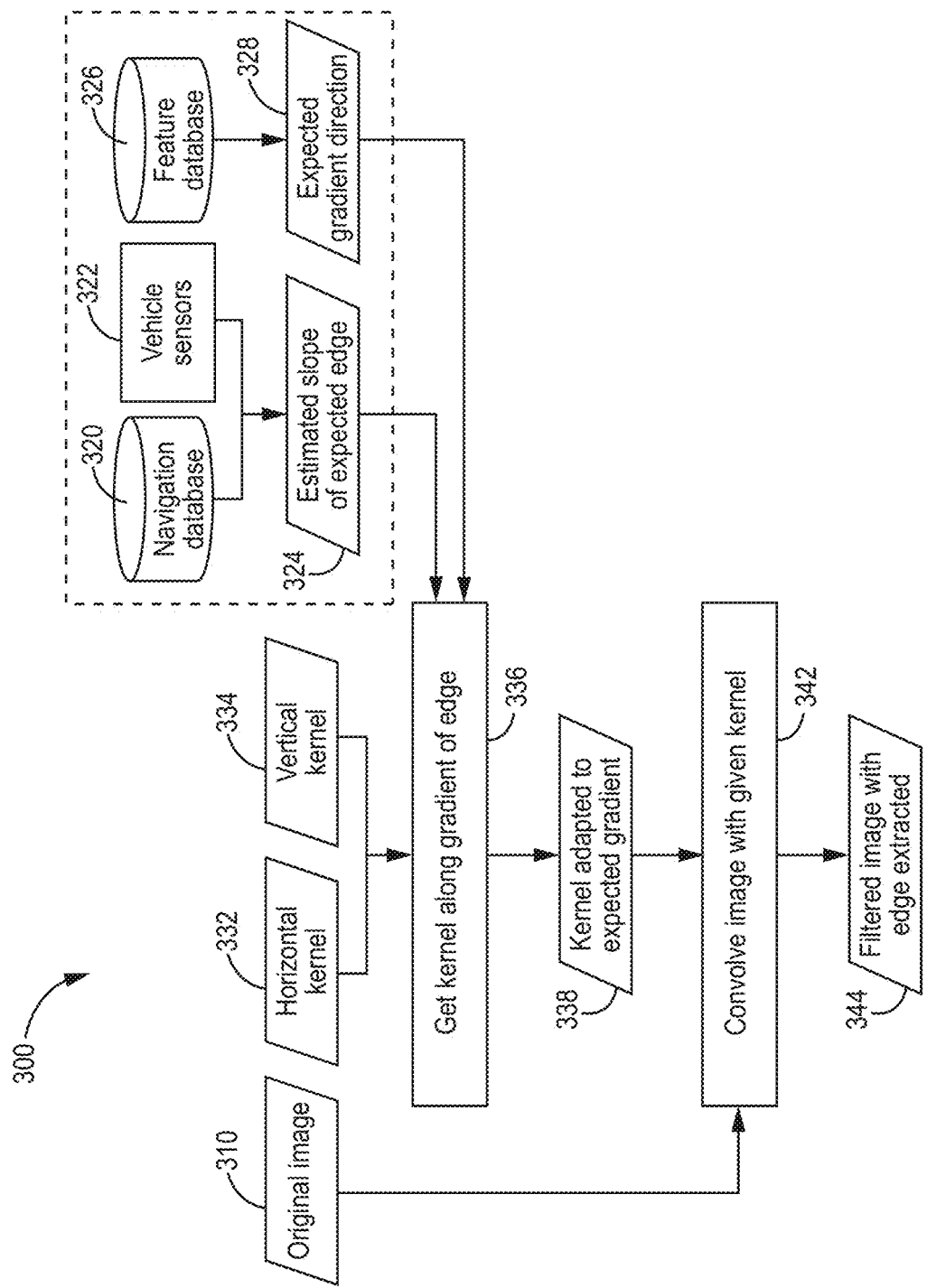
FIG. 3 is flow diagram of a method for adaptive feature extraction, according to another exemplary implementation.

FIG. 3 is flow diagram of a method 300 for adaptive feature extraction, according to an exemplary implementation. The method 300 captures an original image of a landing area with a vehicle camera (block 310). Various features in the landing area can be detected with the camera, such as certain objects or markers, using edges, color profiles, heat maps (for infrared images), shapes and patterns.

The method 300 uses information from a navigation database 320, which provides information about a vehicle landing area of interest such as a heliport or runway, including a position, orientation, dimensions, and marking features of the landing area. For example, information about the landing area can include latitude, longitude, altitude (LLA). The method 300 also uses information from one or more vehicle sensors 322, which provide information about vehicle states, including the vehicle geodetic coordinates and the vehicle attitude such as from onboard inertial sensors. The information from navigation database 320 and vehicle sensors 322 is used to compute an estimated slope of an expected edge feature in the landing area (block 324). In addition, method 300 uses information from a landing area feature database 326, which provides information about various features in the landing area, such as a feature's coarse shape, color, gradient direction, and the like. The information from feature database 326 is used to compute an expected gradient direction of the expected edge feature (block 328).

The method 300 selects a horizontal kernel for the expected edge feature of the landing area (block 332), along an expected horizontal gradient. The method 300 also selects a vertical kernel for an expected edge feature of the landing area (block 334), along an expected vertical gradient. The method 300 obtains a kernel along the gradient of the expected edge feature (block 336) based on the horizontal and vertical kernels (from blocks 332 and 334), the estimated slope of the expected edge feature (from block 324), and the expected gradient direction of the expected edge feature (from block 328). The method 300 then calculates a combined convolution kernel adapted to the expected gradient of the edge feature (block 338).

The method 300 then performs a convolution operation (block 342) on the captured image (from block 310) using the combined convolution kernel (from block 338) to obtain a resulting edge feature image. After similar convolution operations of the entire image, a filtered image with edge features extracted is produced (block 344). The filtered image is then further processed to produce a final output for use by the vision navigation system of the vehicle.

Figure 4:
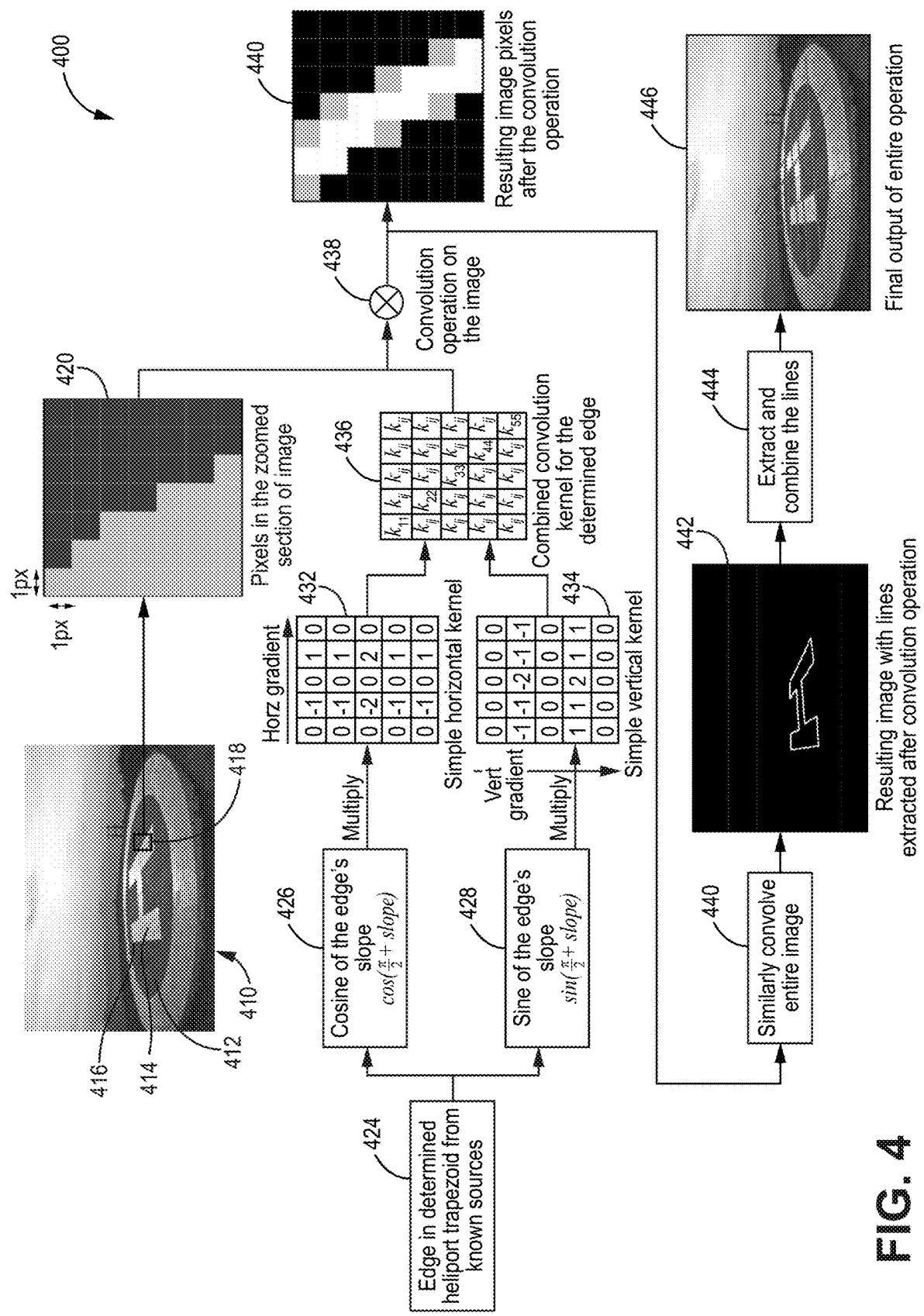
FIG. 4 is flow diagram of a method for adaptive feature extraction for use in landing a vehicle at a heliport, according to one example implementation.

FIG. 4 is flow diagram of a method 400 for adaptive feature extraction for use in landing a vehicle at a heliport, according to one example implementation. The method 400 initially captures an original image 410 of the heliport landing area, such by a vehicle camera. As shown in image 410, a lower pixel intensity pavement is located near the heliport letter "H" feature at 412. A higher pixel intensity pavement is located on the heliport letter "H" feature at 414. A sharp gradient defines the edge of the heliport letter "H" feature at 416. Based on the heliport's information from a database, and a location of the vehicle, original image 410 is narrowed down to a region of interest (ROI) 418. An enlarged view of ROI 418, depicting pixels in a zoomed in section is shown in a digital image 420, which shows how an edge looks in a digital format. The "gradient" referred to here is the rate of change of pixel intensity while moving horizontally or vertically in an image. An edge is qualitatively defined by the sharp change in gradient.

The method 400 uses a few prerequisites from known sources, including information from a navigation database and vehicle sensors. The navigation database provides prior information about the heliport, including LLA of the landing area. The vehicle sensors provide information about the states of the vehicle, including the vehicle geodetic coordinates, and the vehicle attitude from onboard inertial sensors. This data is used to create a coarse prediction of the heliport, using projection geometry. The information from the navigation database and the vehicle sensors is used to compute an estimated slope of an expected edge feature. The information from a feature database is used to compute an expected gradient direction of the expected edge feature.

For example, edge features in a determined heliport trapezoid are computed from the known sources as indicated at 424, which represents the edges of the letter H" feature in the projected coarse ROI created. The errors in the projection are bounded by the errors in the navigation database and the states of the vehicle. Therefore, in the image frame, the coarse projected heliport is defined by a set of lines whose parameters like slope and y intercept can be computed.

As shown in FIG. 4, the cosine of the edge's slope from 424 is calculated at 426, and the sine of the edge's slope from 424 is calculated at 428. These parameters are calculated using the following steps. Initially, the heliport geodetic coordinates and current vehicle geodetic coordinates are converted to Earth-Centered Earth-Fixed (ECEF) coordinates. The ECEF coordinates of the heliport are then converted to vehicle relative North-East-Down (NED) coordinates (navigation frame). Using the attitude of the vehicle from the onboard inertial sensors, the heliport coordinates are converted to a camera frame. With the known intrinsic matrix for the respective camera, the heliport coordinates are converted from the camera frame to an image frame in terms of pixels. Using the start and end pixels representing a letter edge in the image frame, the cosine and sine of the edge's slope is calculated, using the expression:

$$\text{Edge Slope} = \tan^{-1}\frac{(\text{edge end } Y - \text{edge start } Y)}{(\text{edge end } X - \text{edge start } X)} * \frac{180}{\pi}$$

In the cosine and sine of the edge's slope, an extra π/2 is added to correct for the direction of gradient convention.

Figure 5:
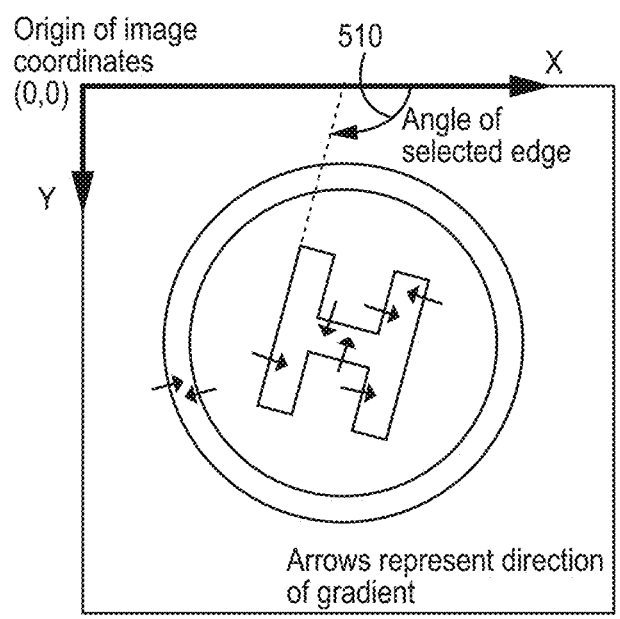
FIG. 5 is a schematic depiction of a heliport landing area, which includes a gradient convention of elements as used in the method of FIG. 4.

The gradient convention of elements as used herein is shown in FIG. 5, which is a schematic depiction of the heliport landing area. The angle of a selected edge is shown at 510, and the various arrows represent the direction of the gradient. The origin of the image coordinates (0, 0) for the X and Y directions is also shown.

Further details on a method of using image frame transforms to produce the estimated slope of an expected edge feature and an expected gradient direction are described below with respect to FIG. 6.

Returning to FIG. 4, a simple horizontal kernel is computed based on the cosine of the edge's slope from 426, and a simple vertical kernel is computed based on the sine of the edge's slope from 428. The simple horizontal and vertical kernels are used as basis kernels. An example matrix 432 for the simple horizontal kernel is shown in FIG. 4. A positive horizontal gradient is defined from left to right in matrix 432, as represented by the increasing magnitude of values in matrix 432. An example matrix 434 for the simple vertical kernel is also depicted. A positive vertical gradient is defined from top to bottom in matrix 434, as represented by the increasing magnitude of values in matrix 434. The magnitude of values in matrix 432 and matrix 434 can be changed according to an expected gradient strength and the edge's dilution in pixels.

A matrix 436 is then obtained that represents a combined convolution kernel for the determined edge. The matrix 436 is obtained after respectively multiplying the cosine and sine values from 426 and 428 with the horizontal and vertical basis kernels represented by matrices 432 and 434. This can be expressed as:

$$k_{ij} = \cos\left(\frac{\pi}{2} + \text{edge\_slope}\right) \cdot H_{ij} + \sin\left(\frac{\pi}{2} + \text{edge\_slope}\right) \cdot V_{ij}$$

where $k_{ij}$ represents elements of the convolution kernel; $H_{ij}$ represents elements of the horizontal basis kernel; $V_{ij}$ represents elements of the vertical basis kernel; and the dot represents elementwise multiplication of the matrix.

A convolution operation 438 is then performed on digital image 420 using the combined convolution kernel represented by matrix 436. The convolution operation 438 can be expressed as:

$$g(x, y) = k * f(x, y) = \sum_{i=-a}^{a} \sum_{j=-b}^{b} k_{ij} \cdot f(x+i, y+j)$$

where g(x,y) represent the convolved image; k is the combined convolution kernel; and f(x,y) represents the original image. The elements of the convolution kernel are considered by the indices i and j, that is: $-a \leq i \leq a$ and $-b \leq dy \leq b$, where a and b represent the size of the kernel as:

$$a = \frac{(\text{kernel\_height} - 1)}{2} \text{ and } b = \frac{(\text{kernel\_width} - 1)}{2}.$$

The convolution operation 438 produces a set of resulting image pixels 440, as shown in FIG. 4. After binarizing resulting image pixels 440, the desired edge gets demarcated by white pixels (value=255) of thickness of 1-2 pixels. Both sides of the edge are set to black pixels (value=0).

A similar convolution operation is then performed on the entire original image, as indicated at 440. A resulting image 442 is produced, with lines extracted, after the convolution operation. This can be followed by image morphology operations such as erosion and dilation. As shown in FIG. 4, the desired edges can be distinguished in resulting image 442. Thereafter, an operation to extract and combine the lines from resulting image 442 is performed, as indicated at 444. This can be done using any common line detection/extraction method like Edge Drawing (ED) lines, Hough transform, or the like.

A final image output 446, with all the desired edges and lines, is then produced by method 400. The lines can be used in post processing to get outputs like ego position, relative position, and other geospatial estimates.

As mentioned above, FIG. 6 is a flow diagram of an exemplary method 600 of using image frame transforms to produce the estimated slope of an expected edge feature, and an expected gradient direction. Although method 600 is described with respect to a heliport, it should be understood that this method is applicable to other vehicle landing areas.

Initially, a heliport LLA 610 is obtained from a navigation database 620, to provide heliport geodetic coordinates, and a vehicle LLA 612 is obtained from vehicle sensors 622, to provide vehicle geodetic coordinates. A conversion operation is performed at 614 to convert the geodetic coordinates to ECEF coordinates, which results in heliport ECEF coordinates 616 and vehicle ECEF coordinates 618. A conversion operation is then performed at 624 to convert the ECEF coordinates to vehicle relative NED coordinates, resulting in heliport coordinates in vehicle relative NED frame at 626.

Using a vehicle attitude 630 from vehicle sensors 622, a conversion operation is then performed at 632 to convert the relative NED frame to a vehicle body frame, resulting in heliport coordinates in vehicle body frame at 634. A conversion operation is then performed at 636 to convert the body frame relative to the camera frame, resulting in heliport coordinates in camera frame at 638.

Using a known camera intrinsic matrix from a database 640, a conversion operation is then performed at 642 to convert the camera frame to an image frame, resulting in heliport coordinates in pixels in an image frame at 644. Geometrical slope computations are then performed on the pixels in the image frame at 646, and an estimated slope of the expected edge is output at 648.

Figure 6:
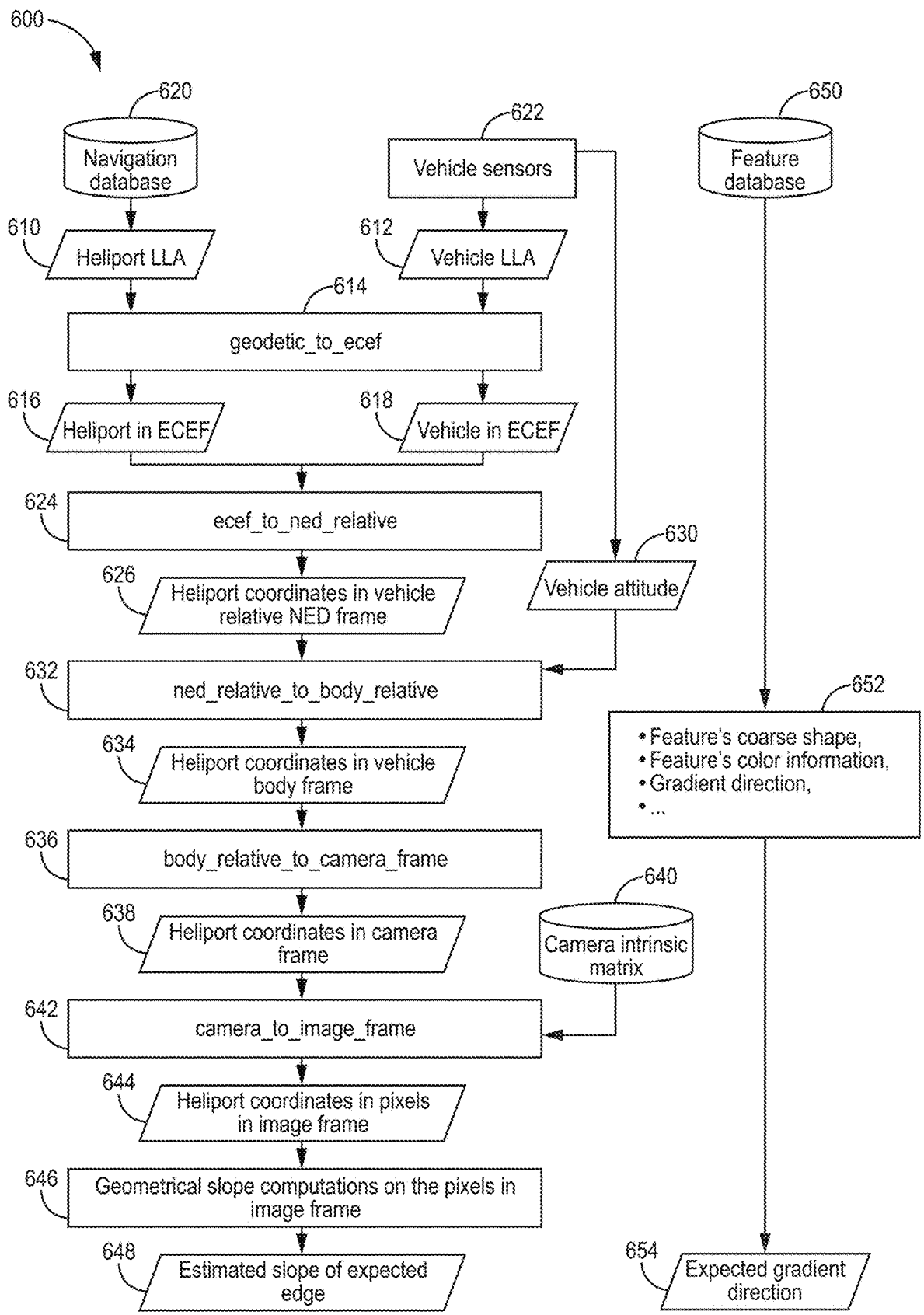
FIG. 6 is a flow diagram of an exemplary method of using image frame transforms to produce an estimated slope of an expected edge feature in the method of FIG. 4.

As shown in FIG. 6, method 600 also uses information from a feature database 650, which provides information about various features in the heliport landing area. Such features include a feature's coarse shape, color information, gradient direction, and the like, as indicated at 652. These features are used to compute an expected gradient direction of the expected edge at 654.

Figure 7A:
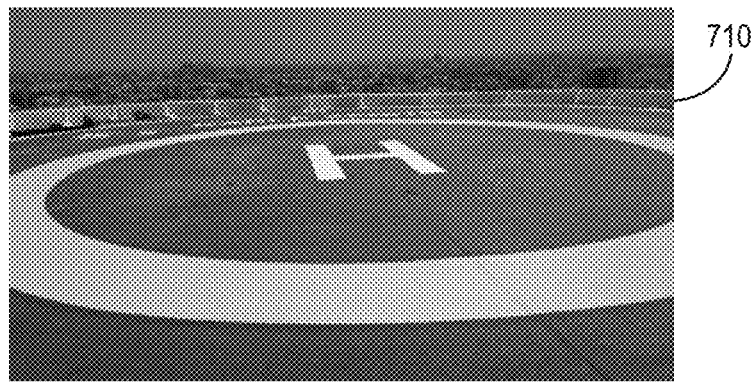
FIGS. 7A-7C depict image results of a simulation using the method for adaptive feature extraction, in a vision assisted landing of a vehicle on a helipad.
Figure 7B:
Figure 7C:

FIGS. 7A-7C show the results of the present approach as applied in a simulation, for visual assisted landing of a vehicle on a helipad. FIG. 7A depicts an original image 710 of the helipad captured by a vehicle camera. FIG. 7B shows a processed image 720 based on original image 710, with the left edges of the helipad features extracted after application of a kernel. FIG. 7C shows a processed image 730 based on original image 710, with the right edges of the helipad features extracted after application of the kernel.

Figure 8A:
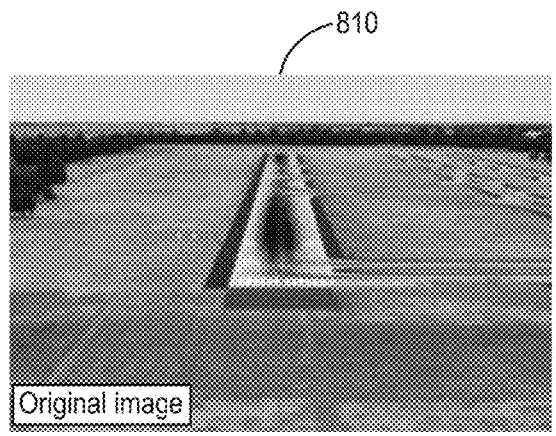
FIGS. 8A-8F depict image results of a simulation using the method for adaptive feature extraction, in a vision assisted landing of an aircraft on a runway.
Figure 8B:
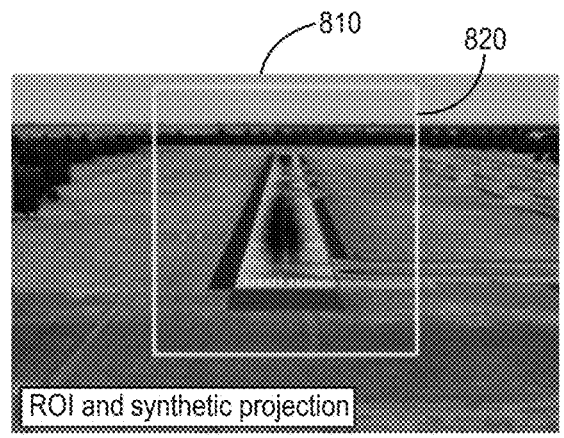
Figure 8C:
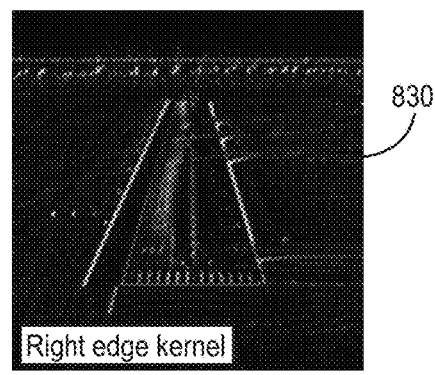
Figure 8D:
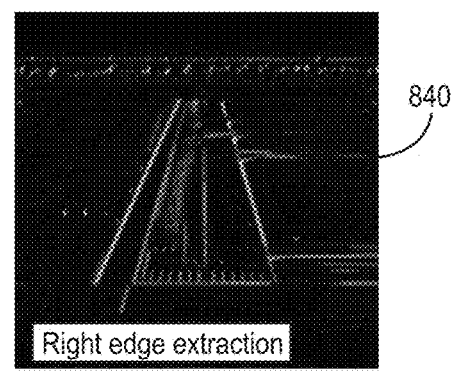
Figure 8E:
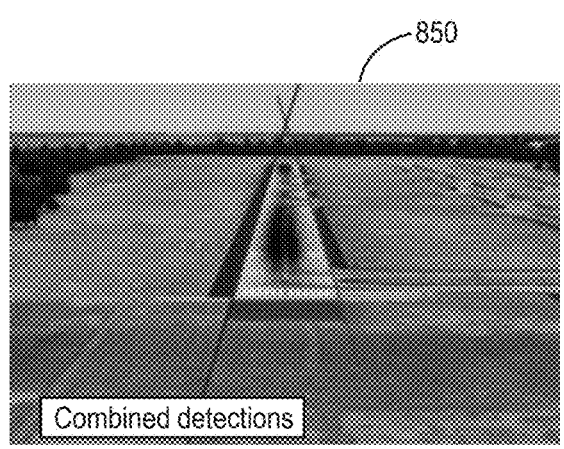
Figure 8F:
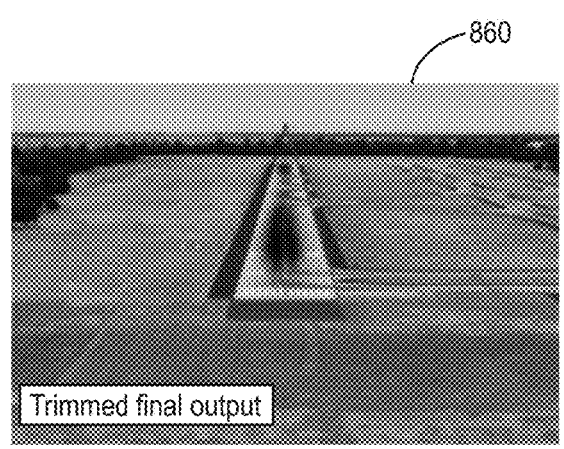

FIGS. 8A-8F show the results of the present approach as applied in a simulation. In particular, FIG. 8A depicts an original image 810 of an aircraft runway. FIG. 8B shows an ROI and synthetic projection 820 overlaid on original image 810, which is detected using the navigation database, own-ship position, and camera parameters. FIG. 8C shows a processed image 830 of a right edge kernel based on the estimated slope (as per 648 in FIG. 6) of the runway edges from synthetic projection 820. FIG. 8D depicts a processed image 840 with right edge extraction after application of the right edge kernel. FIG. 8E shows an output image 850 with the combined edge detections, and FIG. 8F depicts a trimmed final output image 860, which can be employed in various post processing navigation operations.

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a vison-based landing system, comprising: at least one processor onboard an aerial vehicle, at least one vision sensor onboard the aerial vehicle and operatively coupled to the at least one processor, one or more aiding sensors onboard the aerial vehicle and operatively coupled to the at least one processor; and a data storage unit in operative communication with the at least one processor; wherein the at least one processor hosts an adaptive feature extraction module, which has processor readable instructions to perform a method to detect edges on a landing area for the aerial vehicle, the method comprising: capturing at least one image of the landing area with the at least one vison sensor, wherein the landing area includes a plurality of edge features; calculating an estimated slope of an expected edge feature of the landing area; calculating an expected gradient direction of the expected edge feature; selecting a horizontal basis kernel for the expected edge feature along an expected horizontal gradient; selecting a vertical basis kernel for the expected edge feature along an expected vertical gradient; calculating a combined convolution kernel for the expected edge feature based on the horizontal and vertical basis kernels, the estimated slope of the expected edge feature, and the expected gradient direction of the expected edge feature; and performing a convolution operation on the at least one image using the combined convolution kernel to obtain a resulting edge feature image of the landing area.

Example 2 includes the system of Example 1, wherein the aerial vehicle comprises a fixed wing airplane, a helicopter, a vertical take-off and landing (VTOL) vehicle, an unmanned aerial vehicle (UAV), an unmanned aircraft systems (UAS) vehicle, or an urban air mobility (UAM) vehicle.

Example 3 includes the system of any of Examples 1-2, wherein at least one vision sensor comprises a camera.

Example 4 includes the system of any of Examples 1-3, wherein the one or more aiding sensors comprise one or more inertial sensors, a global navigation satellite system (GNSS) receiver, a light detection and ranging (LiDAR) device, or a radio detection and ranging (RADAR) device.

Example 5 includes the system of any of Examples 1-4, wherein the one or more aiding sensors are configured to provide information about a state of the aerial vehicle, including geodetic coordinates of the aerial vehicle, and an attitude of the aerial vehicle.

Example 6 includes the system of any of Examples 1-5, wherein the data storage unit includes a navigation database, and a landing area feature database.

Example 7 includes the system of Example 6, wherein information from the navigation database and the landing area feature database can be relayed to the aerial vehicle via a communication link.

Example 8 includes the system of any of Examples 6-7, wherein the navigation database is configured to provide information about the landing area, including a position, orientation, dimensions, and marking features of the landing area.

Example 9 includes the system of Example 8, wherein the information from the navigation database and the one or more aiding sensors is used to calculate the estimated slope of the expected edge feature.

Example 10 includes the system of any of Examples 6-9, wherein the landing area feature database is configured to provide information about the edge features in the landing area, including coarse shape, color, and gradient direction.

Example 11 includes the system of Example 10, wherein the information from the landing area feature database is used to calculate the expected gradient direction of the expected edge feature.

Example 12 includes the system of any of Examples 1-11, wherein the landing area includes an aircraft runway, a helipad, a vertiport, or any other designated landing area.

Example 13 includes the system of any of Examples 1-12, wherein the plurality of edge features comprise runway edges, heliport markings, vertiport markings, aruco markers, or any other pre-defined landing markings.

Example 14 includes a method for vison-based landing, the method comprising: capturing at least one image of a landing area for an aerial vehicle, the landing area including a plurality of edge features; calculating an estimated slope of an expected edge feature of the landing area; calculating an expected gradient direction of the expected edge feature; selecting a horizontal basis kernel for the expected edge feature along an expected horizontal gradient; selecting a vertical basis kernel for the expected edge feature along an expected vertical gradient; calculating a combined convolution kernel for the expected edge feature based on the horizontal and vertical basis kernels, the estimated slope of the expected edge feature, and the expected gradient direction of the expected edge feature; and performing a convolution operation on the at least one image using the combined convolution kernel to obtain a resulting edge feature image of the landing area.

Example 15 includes the method of Example 14, wherein information from a navigation database and one or more vehicle aiding sensors is used to calculate the estimated slope of the expected edge feature.

Example 16 includes the method of Example 15, wherein the information from the navigation database and the one or more vehicle aiding sensors is processed using image frame transforms to produce the estimated slope of the expected edge feature.

Example 17 includes the method of any of Examples 14-16, wherein information from a landing area feature database is used to calculate the expected gradient direction of the expected edge feature.

Example 18 includes the method of any of Examples 14-17, wherein the resulting edge feature image of the landing area includes extracted lines based on the plurality of edge features.

Example 19 includes the method of any of Examples 14-18, wherein the landing area comprises an aircraft runway, a helipad, or a vertiport; and the plurality of edge features comprise runway edges, heliport markings, vertiport markings, or aruco markers.

Example 20 includes the method of any of Examples 14-19, wherein the aerial vehicle comprises a fixed wing airplane, a helicopter, a vertical take-off and landing (VTOL) vehicle, an unmanned aerial vehicle (UAV), an unmanned aircraft systems (UAS) vehicle, or an urban air mobility (UAM) vehicle.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A vision-based landing system, comprising:
   at least one processor onboard an aerial vehicle;
   at least one vision sensor onboard the aerial vehicle and operatively coupled to the at least one processor;
   one or more aiding sensors onboard the aerial vehicle and operatively coupled to the at least one processor; and
   a data storage unit in operative communication with the at least one processor;
   wherein the at least one processor hosts an adaptive feature extraction module, which has processor readable instructions to perform a method to detect edges on a landing area for the aerial vehicle, the method comprising:
      capturing at least one image of the landing area with the at least one vision sensor, wherein the landing area includes a plurality of edge features;
      selecting a first narrowed down region of interest in the at least one image to produce a first digital image;
      calculating an estimated slope of an expected edge feature of the landing area;
      calculating an expected gradient direction of the expected edge feature;
      selecting a horizontal basis kernel for the expected edge feature along an expected horizontal gradient;
      selecting a vertical basis kernel for the expected edge feature along an expected vertical gradient;
      calculating a combined convolution kernel for the expected edge feature based on the horizontal and vertical basis kernels, the estimated slope of the expected edge feature, and the expected gradient direction of the expected edge feature;
      performing a first convolution operation on the first digital image using the combined convolution kernel to produce a convolved image having first set of image pixels, which are binarized to obtain a resulting edge image; and
      performing at least a second convolution operation on an entirety of the at least one image to produce a resulting edge feature image with extracted lines based on the plurality of edge features;
      wherein a magnitude of values in the horizontal basis kernel and the vertical basis kernel are adapted to be changed according to an expected gradient strength and a dilution of the expected edge feature in pixels.

2. The system of claim 1, wherein the aerial vehicle comprises a fixed wing airplane, a helicopter, a vertical take-off and landing (VTOL) vehicle, an unmanned aerial vehicle (UAV), an unmanned aircraft systems (UAS) vehicle, or an urban air mobility (UAM) vehicle.

3. The system of claim 1, wherein at least one vision sensor comprises a camera.

4. The system of claim 1, wherein the one or more aiding sensors comprise one or more inertial sensors, a global navigation satellite system (GNSS) receiver, a light detection and ranging (LiDAR) device, or a radio detection and ranging (RADAR) device.

5. The system of claim 1, wherein the one or more aiding sensors are configured to provide information about a state of the aerial vehicle, including geodetic coordinates of the aerial vehicle, and an attitude of the aerial vehicle.

6. The system of claim 1, wherein the data storage unit includes a navigation database, and a landing area feature database.

7. The system of claim 1, wherein information from the navigation database and the landing area feature database can be relayed to the aerial vehicle via a communication link.

8. The system of claim 1, wherein the navigation database is configured to provide information about the landing area, including a position, orientation, dimensions, and marking features of the landing area.

9. The system of claim 8, wherein the information from the navigation database and the one or more aiding sensors is used to calculate the estimated slope of the expected edge feature.

10. The system of claim 6, wherein the landing area feature database is configured to provide information about the edge features in the landing area, including coarse shape, color, and gradient direction.

11. The system of claim 10, wherein the information from the landing area feature database is used to calculate the expected gradient direction of the expected edge feature.

12. The system of claim 1, wherein the landing area includes an aircraft runway, a helipad, a vertiport, or any other designated landing area.

13. The system of claim 1, wherein the plurality of edge features comprise runway edges, heliport markings, vertiport markings, aruco markers, or any other pre-defined landing markings.

14. A method for vision-based landing, the method comprising:
    capturing at least one image of a landing area for an aerial vehicle, the landing area including a plurality of edge features;
    selecting a first narrowed down region of interest in the at least one image to produce a first digital image;
    calculating an estimated slope of an expected edge feature of the landing area;
    calculating an expected gradient direction of the expected edge feature;

selecting a horizontal basis kernel for the expected edge feature along an expected horizontal gradient;

selecting a vertical basis kernel for the expected edge feature along an expected vertical gradient;

calculating a combined convolution kernel for the expected edge feature based on the horizontal and vertical basis kernels, the estimated slope of the expected edge feature, and the expected gradient direction of the expected edge feature; and performing a first convolution operation on the first digital image using the combined convolution kernel to produce a convolved image having a first set of image pixels, which are binarized to obtain a resulting edge image; and performing at least a second convolution operation on an entirety of the at least one image to produce a resulting edge feature image with extracted lines based on the plurality of edge features;

wherein a magnitude of values in the horizontal basis kernel and the vertical basis kernel are adapted to be changed according to an expected gradient strength and a dilution of the expected edge feature in pixels.

15. The method of claim 14, wherein information from a navigation database and one or more vehicle aiding sensors is used to calculate the estimated slope of the expected edge feature.

16. The method of claim 15, wherein the information from the navigation database and the one or more vehicle aiding sensors is processed using image frame transforms to produce the estimated slope of the expected edge feature.

17. The method of claim 14, wherein information from a landing area feature database is used to calculate the expected gradient direction of the expected edge feature.

18. The method of claim 14, wherein:
the landing area comprises an aircraft runway, a helipad, or a vertiport; and
the plurality of edge features comprise runway edges, heliport markings, vertiport markings, or aruco markers.

19. The method of claim 14, wherein the aerial vehicle comprises a fixed wing airplane, a helicopter, a vertical take-off and landing (VTOL) vehicle, an unmanned aerial vehicle (UAV), an unmanned aircraft systems (UAS) vehicle, or an urban air mobility (UAM) vehicle.

20. The method of claim 14, wherein
the estimated slope of the expected edge feature is calculated, using edge start and edge end pixels, by the expression:

$$\text{Edge Slope} = \tan^{-1} \frac{(\text{edge end } Y - \text{edge start } Y)}{(\text{edge end } X - \text{edge start } X)} * \frac{180}{\pi};$$

the combined convolution kernel is calculated by the expression:

$$k_{ij} = \cos\left(\frac{\pi}{2} + \text{edge\_slope}\right).H_{ij} + \sin\left(\frac{\pi}{2} + \text{edge\_slope}\right).V_{ij}$$

where:
$k_{ij}$ represents elements of the combined convolution kernel;
$H_{ij}$ represents elements of the horizontal basis kernel;
$V_{ij}$ represents elements of the vertical basis kernel; and
the dot represents elementwise multiplication of the matrix; and the first convolution operation is performed, using the expression:

$$g(x, y) = k * f(x, y) = \sum_{i=-a}^{a} \sum_{j=-b}^{b} k_{ij}.f(x+i, y+j)$$

where:
g(x,y) represents the convolved image;
k is the combined convolution kernel; and
f(x,y) represents the at least one image;
wherein elements of the combined convolution kernel are considered by indices i and j, such that: −a≤i≤a and −b≤dy≤b, where a and b represent a size of the combined convolution kernel as:

$$a = \frac{(\text{kernel\_height} - 1)}{2} \text{ and } b = \frac{(\text{kernel\_width} - 1)}{2}.$$

* * * * *